United States Patent

Cho

[11] Patent Number: 5,881,052
[45] Date of Patent: Mar. 9, 1999

[54] LINE SIGNAL ANALYZING METHOD FOR USE IN AN ELECTRONIC SWITCHING SYSTEM

[75] Inventor: Seung-Mo Cho, Incheon, Rep. of Korea

[73] Assignee: Daewoo Telecom Ltd., Incheon, Rep. of Korea

[21] Appl. No.: 755,538

[22] Filed: Nov. 21, 1996

[30] Foreign Application Priority Data

Nov. 21, 1995 [KR] Rep. of Korea .................. 1995-42462

[51] Int. Cl.[6] .................................................. G01R 31/08
[52] U.S. Cl. .................... 370/250; 370/242; 370/244; 379/15; 379/32; 379/34
[58] Field of Search .................................. 370/242, 244, 370/250; 379/9, 10, 14, 15, 32, 34

[56] References Cited

U.S. PATENT DOCUMENTS 5,684,868 11/1997 Alexander ................................. 379/140
5,778,003 7/1998 Puppa et al. ............................. 370/249

Primary Examiner—Michael Horabik
Assistant Examiner—Binyam Tadesse
Attorney, Agent, or Firm—Pennie & Edmonds LLP

[57] ABSTRACT

A method for use in an electronic switching system (ESS) analyzes M×N sets of line signals communicating between itself and at least one other ESS. At a first step, two previous sending and receiving line signals for a voice channel from each of the two ESS's are provided as a first pair of line signals. At a second step, two current sending and receiving line signals from each of the two ESS's form a second pair of line signals. At a third step, each of the line signals in the second pair is compared with its corresponding line signal in the first pair to check whether at least one line signal in the second pair is different from the corresponding line signal in the first pair. At a fourth step, if the checked result is negative, the second and the third steps are repeated for a predetermined duration, and if otherwise, a time interval value between one of the line signals in the second pair and its corresponding different line signal in the first pair is calculated. At a fifth step, it is checked that the calculated time interval value exists within its corresponding range among a predetermined set of ranges of time duration of line signals of the channel to determine the status of the different line signal in the first pair. At a final step, the steps from the second to the fifth are repeated until all of M×N sets of line signals of N voice channels are processed.

3 Claims, 1 Drawing Sheet

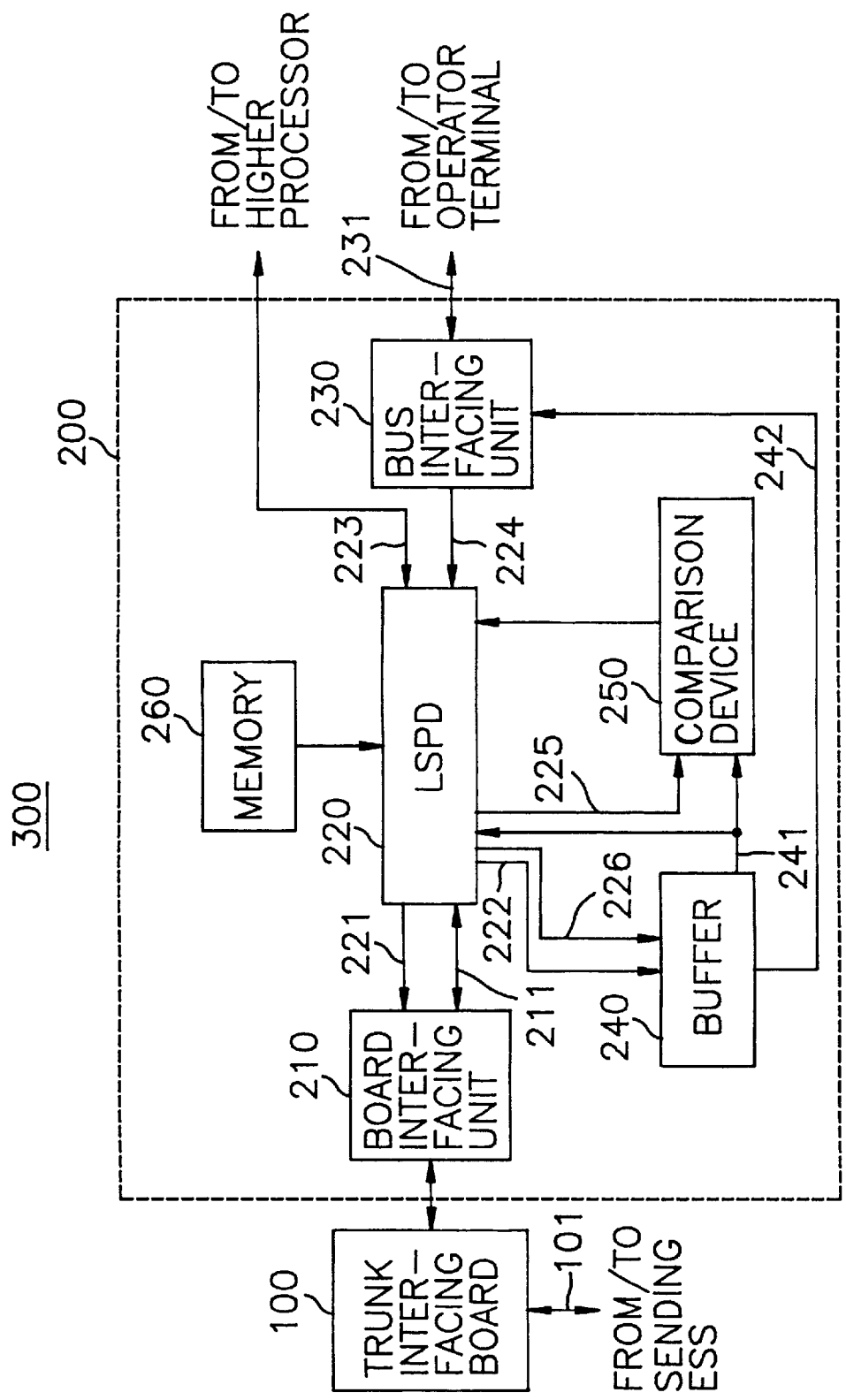

5,881,052

LINE SIGNAL ANALYZING METHOD FOR USE IN AN ELECTRONIC SWITCHING SYSTEM

FIELD OF THE INVENTION

The present invention relates to a line signal analyzing method for use in an electronic switching system; and, more particularly, to a method capable of analyzing a line signal communicating between the system and at least one other system.

BACKGROUND OF THE INVENTION

As is well known, an electronic switching system (ESS) selectively connects two assigned subscribers out of many so as to establish a communications line between them.

Basic components of the ESS include a multiplicity of access switching subsystems, an interconnection network subsystem and a central control subsystem. Each access switching subsystem includes a plurality of subscriber interfacing units and a time division switching unit to communicate information between two selected subscribers. When the two selected subscribers are coupled to an access switching subsystem, they are connected within the same access switching subsystem. On the other hand, when the two selected subscribers are coupled to two different access switching subsystems, they are connected through the interconnection network subsystem. The interconnection network subsystem, coupled with each of the access switching subsystems and the central control subsystem, includes a central data link module and a space division switching unit and connects the two selected subscribers. Finally, the central control subsystem coupled with the access switching subsystems and the interconnection network subsystem controls all the operations and maintenance processes of the ESS.

The ESS further includes a line signal handling device which is coupled to the interconnection network subsystem and used to process a multiplicity of sets of line signals to be communicated between itself and at least one other ESS over designated channels of a plurality of trunks formed therebetween. As is well known, the sets of line signals represent control information employed for a call processing between the ESS and the other ESS.

According to E-1 type issued by a European Telecommunications Standards Institute (ETSI), each trunk combines N, e.g., 30, voice channels and P, e.g., 2, common signal channels, wherein N and P are positive integers, respectively. In the E-1 type, each of the thirty sets of line signals is communicated over one of the two common signal channels; and carries corresponding voice channel status information on all actions taken to make a call between the two ESS's. As is well known in the art, each of the line signals in said each set is normally transmitted for a separate predetermined range of time duration which is decided based on one of the conventional protocols, e.g., G. 704 issued by International Telegraph and Telephone Consultative Committee (CCITT). Through such communications of the multiplicity of sets of line signals, a call processing can be efficiently carried out between the ESS and the other ESS.

However, in such a line signal handling device provided in the ESS, any of the line signals in each set may be communicated between the two ESS's for a shorter or longer time duration than a predetermined range of time duration due to, e.g., a malfunctioning of a device or an error in any of the software programs incorporated in the ESS, thereby failing to provide a normal call processing. Consequently, it is desirable to analyze each of the line signals to be communicated between two ESS's selected from a plurality of ESS's and display information representing the status thereof on a display device.

Hitherto, no prior art ESS is known to have such analyzing and displaying capabilities.

SUMMARY OF THE INVENTION

It is, therefore, a primary object of the present invention to provide a line signal analyzing method, for use in an ESS, capable of analyzing each of line signals being communicated between the ESS and at least one other ESS to thereby provide information representing the status thereof on a display device.

In accordance with the present invention, there is provided a method, for analyzing M×N sets of line signals being communicated between the ESS and at least one other ESS (representatively referred to as "another ESS") through designated channels of M trunks formed therebetween, M being a positive integer and N being a positive integer representing the number of voice channels, wherein said M×N sets of line signals represent control information employed for a call processing between the ESS and said another ESS and each trunk is capable of carrying N sets of line signals over a designated channel out of P common signal channels and also carrying voice information from a subscriber over a corresponding channel thereto, P being a positive integer, said N sets of line signals containing N voice channel status information on all actions taken during the call processing and said each set of line signals sequentially communicating between the two ESS's, the method comprising the steps of:

(a) receiving and storing a previous sending line signal and a previous receiving line signal transmitted from each of the ESS and said another ESS, respectively, out of a set of line signals from a voice channel, to thereby provide two stored previous line signals as a first pair of line signals;

(b) receiving a current sending line signal and a current receiving line signal transmitted from each of the ESS and said another ESS, respectively, to thereby generate two received current line signals as a second pair of line signals;

(c) comparing each line signal contained in the second pair with each corresponding line signal included in the first pair to check whether or not at least one line signal in the second pair is different from the corresponding line signal in the first pair;

(d) if both line signals in the second pair are identical to their respective corresponding line signals in the first pair, repeating said steps (b) and (c) for a predetermined duration, a predetermined time period being elapsed between each repetition; and if there is at least one different line signal, calculating a time interval between one of the line signals in the second pair and its corresponding different line signal in the first pair, to provide a calculated time interval value as a calculated time duration value of the different line signal in the first pair, wherein the predetermined duration is decided on the basis of the line signals in the second pair provided in said step (b) and the time interval value is calculated by using the predetermined time period, the repeated times thereof and the predetermined duration;

(e) checking whether or not the calculated time duration value of the different line signal in the first pair exists within its corresponding range among a predetermined set of ranges of time duration of all line signals contained in a set of the voice channel, to determine the status of the different line signal in the first pair, wherein the status thereof is considered to be normal if the calculated time duration value exists within the corresponding range in the predetermined set, and erroneous if otherwise;

(f) repeating said steps (a) to (e) for a next pair of line signals until all the line signals in the set of the voice channel are processed; and (g) repeating said steps (a) to (f) for a next voice channel until all of said M×N sets of line signals of said N voice channels are processed.

BRIEF DESCRIPTION OF THE DRAWING

The above and other objects and features of the present invention will become apparent from the following description of preferred embodiments given in conjunction with the accompanying drawing, which is a block diagram in accordance with the present invention illustrating a novel apparatus for analyzing line signals communicating between two ESS's selected from a plurality of ESS's.

DETAILED DESCRIPTION OF THE PREFERRED EMBODIMENTS

Referring to the drawing, there is provided a block diagram of a novel apparatus 300 of the present invention, for use in an ESS, for analyzing M×N sets of line signals communicating between the ESS and at least one other ESS (not shown) over M trunks formed therebetween, wherein M and N are positive integers, respectively, N representing the number of voice channels. As is well known, each of the M×N sets of line signals is not voice information but control information used for a call processing between the ESS and the other ESS's.

According to E-1 type issued by the ETSI, each trunk combines N, e.g., 30, voice channels and P, e.g., 2, common signal channels, P being a positive integer. In the E-1 type, each of thirty sets of line signals is communicated over one of the two common signal channels; and carries corresponding voice channel status information on all actions taken to make a call between the two ESS's. As is well known in the art, each line signal in said each set is normally transmitted for a separate predetermined range of time duration which is decided on the basis of one of the conventional protocols, e.g., G. 704 issued by a CCITT. The inventive line signal analyzing apparatus 300 comprises a trunk interfacing board 100, and a line signal analyzing module 200 which includes a board interfacing unit 210 and a bus interfacing unit 230, a line signal processing device (LSPD) 220, a buffer 240, a comparison device 250 and a memory 260. For the sake of simplicity, the inventive apparatus will be described, as illustrated in the drawing, with respect to two ESS's, e.g., the ESS and a sending ESS which is selected from the other ESS's, one trunk 101 out of the M trunks formed therebetween, and a set of line signals for one voice channel selected from the thirty voice channels accommodated in the trunk from now on.

For the sake of illustration, it is assumed that a line signal, e.g., a channel seizure (CS) signal, is transmitted from the sending ESS to the trunk interfacing board 100 of the ESS through the trunk 101, to make a call while separate line signals, e.g., two idle state signals indicating that the two ESS's are all in an idle state, are being communicated therebetween. An alternate mark inversion (AMI) interfacing mode may be advantageously utilized in the sending ESS, wherein the CS signal is issued by one of higher processors (or user parts) (not shown) within the sending ESS and transmitted at a first predetermined transfer rate, e.g., 2.048 Mbps.

At the trunk interfacing board 100, the transfer rate, i.e., 2.048 Mbps, of the CS signal provided through the trunk 101 is converted into a second predetermined transfer rate, e.g., 10 Mbps, to interface the CS signal with the board interfacing unit 210. The CS signal so processed is then relayed to the board interfacing unit 210, wherein the transfer rate thereof is converted to match the trunk interfacing board 100 with the LSPD 220. Specifically, the board interfacing unit 210, in response to an address signal ADDS prestored in a buffer (not shown) incorporated therein, first selects the CS signal provided from the trunk interfacing board 100 that is one of many components or boards (not shown) within the ESS. And then, the transfer rate, i.e., 10 Mbps, of the CS signal selected is converted into a third predetermined transfer rate, e.g., 20 Mbps, to interface the CS signal with the LSPD 220. The CS signal so converted is then sent to the LSPD 220 via a bus 211. The signal ADDS indicating the address of the trunk interfacing board 100 is actually issued by the LSPD 220 and is provided to the buffer via a line 221 for the storage thereof.

The LSPD 220 receives and processes the CS signal provided through the bus 211 based on the G. 704 protocol, wherein since methods of processing the CS signal and other line signals to be received by the LSPD 220 later are well known in the art, details thereof are omitted here for the sake of simplicity. Thereafter, the CS signal so processed is transmitted via a bus 223 to a next processor, e.g., one of higher processors (not shown), included in the ESS for the call processing.

If the LSPD 220 receives a channel seizure acknowledgement (CSA) signal from the higher processor through the bus 223 after the transmission of the CS signal to the higher processor, it processes the received CSA signal by using the G. 704 protocol and then provides the processed CSA signal to the sending ESS through the bus 211, the board interfacing unit 210, the trunk interfacing board 100 and the trunk 101 for the call processing. For interfacing the CSA signal from the bus 211 with the sending ESS, the CSA signal is processed through the use of a similar rate conversion method as described above at each of the board interfacing unit 210 and the trunk interfacing unit 100. This process is sequentially repeated until all of the line signals in the set are processed, i.e., the call processing is completely terminated; and, the details of the processing of the remainder of the line signals as mentioned above are omitted here for the sake of simplicity.

On the other hand, when an operator of the ESS wishes to analyze the set of line signals for the selected voice channel communicating between the ESS and the sending ESS during a normal call processing operation as described above, they can be advantageously analyzed through the use of a novel line signal analyzing scheme of the present invention.

Specifically, in the inventive line signal analyzing scheme, if a line signal analyzing initiation (LSAI) signal to analyze several or all of the line signals in the set is issued at an operator terminal (not shown) attached to the ESS and applied to the LSPD 220 through a bus 231, the bus interfacing unit 230 and a bus 224, it initiates to analyze them. The LSAI signal may be produced by using a predetermined key in a key pad (not shown) of the operator terminal, wherein the LSAI signal is transmitted at a fourth predetermined transfer rate, e.g., 800 Kbps. Such LSAI signal may be formatted or formed on the basis of one of very common bit-oriented schemes, e.g., a high level data link control protocol issued by the International Organization for Standardization, well known in the art. As shown in the drawing, for interfacing the LSAI signal from the bus 231 with the LSPD 220, the bus interfacing unit 230 is coupled therebetween, wherein the transfer rate, i.e., 800 Kpbs, of the LSAI signal is converted into the third predetermined transfer rate, i.e., 20 Mbps.

Assuming that the LSPD 220 simultaneously detects and receives a pair of line signals, e.g., a dial pulse make (DPM) and an answer (ANS) signals, from the buses 211 and 223, respectively, after the receipt of the LSAI signal, it processes the DPM and the ANS signals based on the G. 704 protocol and then issues a first buffer control signal BCS1. Thereafter, the DPM and the ANS signals processed by the LSPE 220 are delivered to the buffer 240 through a bus 222, and sent for the call processing to the higher processor through the bus 223 and to the sending ESS through the bus 211, the board interfacing unit 210, the trunk interfacing board 100 and the trunk 101, respectively. And the first buffer control signal BCS1 generated by the LSPD 220 is provided to the buffer 240 via a line 226. The buffer 240, in response to the first buffer control signal BCS1, starts to store the DPM and the ANS signals provided through the bus 222 in a first and a second regions of a first column thereof, respectively.

If a next pair of line signals, e.g., a clear (CLR) (or DPM) and the ANS signals from the buses 223 and 211, respectively, are simultaneously detected and received by the LSPD 220 after the DPM and the ANS signals have been received and processed and then after a first predetermined time period, e.g., 8 msec, is elapsed, the LSPD 220 also processes the received CLR (or DPM) and the ANS signals according to the G. 704 protocol and generates a second buffer control signals BCS2. Subsequently, the CLR (or DPM) and the ANS signals processed by the LSPD 220 are relayed, as a first pair of line signals, to the buffer 240 and the comparison device 250 via the bus 222 and a bus 225, respectively, while the second buffer control signal BCS2 generated by the LSPD 220 is provided to the buffer 240 via the line 226. Also, the CLR (or DPM) and the ANS signals are transferred for the call processing to the higher processor through the bus 223 and to the sending ESS via the bus 211, the board interfacing unit 210, the trunk interfacing board 100 and the trunk 101.

In response to the second buffer control signal BCS2, it reads the two line signals previously stored therein, i.e., the DPM and the ANS signals, to provide them via a bus 241 to the comparison device 250 as a second pair of line signals. The comparison device 250 compares each of the line signals included in the first pair from the bus 222 with a corresponding line signal contained in the second pair from the bus 241, respectively, to check whether or not at least one line signal in the first pair is different from a corresponding line signal in the second pair. When the checking processes are completed, the comparison device 250 generates a counter reference (CR) signal that is derived based on the checked result to provide the CR signal to the LSPD 220.

In case where an input to the LSPD 220 is the CR signal indicating that the checked result is negative, i.e., both the line signals in the first pair are identical to their respective corresponding line signals in the second pair, the LSPD 220 continues to perform the detection and receiving operation after a second predetermined time period, e.g., 8 msec, is elapsed. In this case, any of the line signals in the first pair, i.e., the DPM and the ANS signals, is never stored in the buffer 240. In a preferred embodiment of the invention, such a detection and receiving operation is sequentially repeated for a predetermined duration, the predetermined time period, i.e., 8 msec, being elapsed between each repetition, wherein the predetermined time period is decided in advance and issued by a timer (not shown) incorporated in the LSPD 220 and the predetermined duration is decided in advance according to a pair of line signals to be detected and received by the LSPD 220.

On the other hand, in case where the input to the LSPD 220 is the CR signal indicating that the checked result is affirmative, i.e., there is at least one different line signal, it calculates a time interval value between one of the line signals in the first pair and its corresponding different line signal in the second pair by using the predetermined time period, the repeated times thereof and the predetermined duration. The time interval value between the two line signals, i.e., the CLR signal in the first pair and the ANS signal in the second pair, as illustrated above, indicates a time duration taken to receive the CLR signal transmitted from the sending ESS after the transmission of the ANS signal to the sending ESS. Such time interval value may be easily calculated by employing a counter (not shown) and the timer incorporated in the LSPD 220.

And then, the LSPD 220 generates a third and a fourth buffer control signals BCS3 and BCS4 and provides the same and the calculated time interval value as a calculated time duration value to the buffer 240 via the line 226 and the bus 222, respectively. In response to the third buffer control signal BCS3, the buffer 240 stores the first pair of line signals provided through the bus 222 in a first and a second regions of a second column thereof, respectively; and, in response to the fourth buffer control signal BCS4, it also stores the time duration value in a third region thereof. This process is sequentially repeated until the remainder of the four line signals as explained above are all processed, i.e., the call processing operation is completely terminated.

If all of the four line signals and the remainder thereof have been processed and stored in the buffer 240, the LSPD 220 first monitors all the line signals in the set and their time duration value stored in the buffer 240 through the bus 241 and then checks whether or not the monitored time duration value on each of the line signals exists within its corresponding range out of a predetermined set of ranges stored in the memory 260. The predetermined set of ranges includes ranges of time duration of the line signals in the set of the voice channel. If all the monitored time duration value on the line signals in the set has been checked, the LSPD 220 issues a fifth buffer control signal BCS5 and provides the same and normal or abnormal information representing the checked result of each of them to the buffer 240 via the line 226 and the bus 222, respectively. The buffer 240, in response to the fifth buffer control signal BCS5, stores the normal or abnormal information for each of the checked results in a fourth region of a corresponding column thereof.

In a preferred embodiment of the invention, all the information stored in the buffer 240 is provided to a monitor (not shown) of the operator terminal through a bus 242, the bus interfacing unit 230 and the bus 231 for its visual display, wherein one of the conventional signal display techniques well known in the art is employed in the monitor. In addition to the display function for the analyzed results, it may be designed so that the information displayed on the monitor can be printed through a line printer (not shown) attached to the operator terminal. Even though there is explained with respect to the set of the line signals for only the one selected voice channel for the sake of simplicity, it should be appreciated that sets of the line signals for several or all of the voice channels accommodated in the trunk 101 can be selectively analyzed by using the same method as described above. As shown above, therefore, the present invention can effectively analyze line signals to be communicated between the ESS and at least one other ESS employing a novel line signal analyzing scheme to thereby provide information representing the status of each of them on a display device.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in an electronic switching system (ESS), for analyzing M×N sets of line signals being communicated between the ESS and at least another ESS through designated channels of M trunks formed therebetween, M being a positive integer and N being a positive integer representing the number of voice channels, wherein said M×N sets of line signals represent control information employed for a call processing between the ESS and said another ESS and each trunk is capable of carrying N sets of line signals over a designated channel out of P common signal channels and also carrying voice information from a subscriber over a corresponding channel thereto, P being a positive integer, said N sets of line signals containing N voice channel status information on all actions taken during the call processing and said each set of line signals sequentially communicating between the two ESS's, the method comprising the steps of:

(a) receiving and storing a previous sending line signal and a previous receiving line signal transmitted from each of the ESS and said another ESS, respectively, out of a set of line signals from a voice channel, to thereby provide two stored previous line signals as a first pair of line signals;

(b) receiving a current sending line signal and a current receiving line signal transmitted from each of the ESS and said another ESS, respectively, to thereby generate two received current line signals as a second pair of line signals;

(c) comparing each line signal contained in the second pair with each corresponding line signal included in the first pair to check whether or not at least one line signal in the second pair is different from the corresponding line signal in the first pair;

(d) if both line signals in the second pair are identical to their respective corresponding line signals in the first pair, repeating said steps (b) and (c) for a predetermined duration, a predetermined time period being elapsed between each repetition; and if there is at least one different line signal, calculating a time interval between one of the line signals in the second pair and its corresponding different line signal in the first pair, to provide a calculated time interval value as a calculated time duration value of the different line signal in the first pair, wherein the predetermined duration is decided on the basis of the line signals in the second pair provided in said step (b) and the time interval value is calculated by using the predetermined time period, the repeated times thereof and the predetermined duration;

(e) checking whether or not the calculated time duration value of the different line signal in the first pair exists within its corresponding range among a predetermined set of ranges of time duration of all line signals contained in a set of the voice channel, to determine the status of the different line signal in the first pair, wherein the status thereof is considered to be normal if the calculated time duration value exists within the corresponding range in the predetermined set, and erroneous if otherwise;

(f) repeating said steps (a) to (e) for a next pair of line signals until all the line signals in the set of the voice channel are processed; and (g) repeating said steps (a) to (f) for a next voice channel until all of said M×N sets of line signals of said N voice channels are processed.

2. The method of claim 1, further comprising the step of displaying information representing the status of each of the line signals in said M×N sets obtained from said step (g) on an operator terminal of the ESS.

3. The method of claim 2, further comprising the step of printing the information displayed on the operator terminal to thereby provide printed information.

* * * * *